(12) United States Patent
Kanbe

(10) Patent No.: US 7,161,731 B2
(45) Date of Patent: Jan. 9, 2007

(54) METHOD OF MANUFACTURING ELECTROPHORETIC DISPLAY

(75) Inventor: Sadao Kanbe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 11/029,477

(22) Filed: Jan. 6, 2005

(65) Prior Publication Data

US 2005/0146776 A1 Jul. 7, 2005

(30) Foreign Application Priority Data

Jan. 7, 2004 (JP) .............................. 2004-001715
Jan. 7, 2004 (JP) .............................. 2004-001716
Sep. 8, 2004 (JP) .............................. 2004-261105

(51) Int. Cl.
*G02B 26/00* (2006.01)
*G09G 3/38* (2006.01)

(52) U.S. Cl. .................................. 359/296; 345/107

(58) Field of Classification Search ................ 345/107; 359/296

See application file for complete search history.

(56) References Cited

U.S. PATENT DOCUMENTS 6,654,159 B1 * 11/2003 Kawai et al. ............... 359/296
6,717,716 B1 * 4/2004 Kawai ......................... 359/296
6,927,893 B1 * 8/2005 Kawai et al. ............... 359/296
6,947,203 B1 * 9/2005 Kanbe ......................... 359/296
7,038,832 B1 * 5/2006 Kanbe ......................... 359/296
2006/0103915 A1 * 5/2006 Kawai ......................... 359/296

FOREIGN PATENT DOCUMENTS

| JP | A 2003-222913 | 8/2003 |
|---|---|---|
| JP | A 2003-295234 | 10/2003 |
| JP | A 2003-295235 | 10/2003 |
| JP | A 2004-037507 | 2/2004 |
| JP | A 2004-053679 | 2/2004 |
| JP | A 2004-102235 | 4/2004 |
| JP | A 2004-139025 | 5/2004 |

* cited by examiner

*Primary Examiner*—David N. Spector
(74) *Attorney, Agent, or Firm*—Oliff & Berridge, PLC

(57) ABSTRACT

An exemplary embodiment provides a method of manufacturing an electrophoretic display that has a display part including an electrophoretic particle electrophoresed by the application of an electric field between a pair of substrates and reduces or prevents color mixture between regions displaying different colors. The method includes first disposing a first display part on one substrate, and second disposing a second display part that has a different color from a color of the first display part on one of the pair of substrates. The first display part is dried before the second display part is disposed.

13 Claims, 11 Drawing Sheets

METHOD OF MANUFACTURING ELECTROPHORETIC DISPLAY

BACKGROUND

Exemplary embodiments of the present invention relate to a method of manufacturing an electrophoretic display.

In the related art, reflective displays that are viewable under a surrounding natural brightness have been developed and therefore can be used in matters relating to printing. In the related art, electrophoretic displays, which do not need polarizers and have a high efficiency of use of light, have been a focus of attention as such reflective displays.

In electrophoretic displays, for example, a pair of substrates, at least one of which is a transparent substrate, are disposed facing each other. A dispersion liquid, including particles (electrophoretic particles) that are electrophoresed by the application of an electric field, is disposed between these substrates.

Examples of the electrophoretic displays are disclosed in Japanese Unexamined Patent Publications No. 2003-295234 and No. 2003-295235, for example. In these techniques, microcapsules filled with a dispersion liquid that includes white-colored particles negatively charged and particles that are colored in a different color and are positively charged, are disposed between substrates having electrodes. Then, the color viewed from the viewing side (transparent substrate side) is changed by varying the polarity of one or the other electrode.

Specifically, when a positive voltage is applied to the electrode on the viewing side, the negatively charged particles (white particles) are electrophoresed toward the transparent substrate side by a Coulomb force so as to attach to the electrode of the viewing side. When the display in this state is viewed from the transparent substrate side, a part in which the particles have been attached to and a layer that has been formed looks white. In contrast, when the polarity of an applied voltage is reversed, the particles positively charged (particles colored in a different color) attach to the electrode on the viewing side so as to form a layer, so that the display looks like the color thereof.

In addition, another electrophoretic display has been also proposed. In this display, a non-transparent substrate is colored in a color different from that of particles. Then, a voltage having the polarity opposite of that of the particles is applied to an electrode between substrates, whereby the particles are attached to the electrode. Thus, the color of the non-transparent substrate is displayed. In contrast, a voltage is not applied to the electrode so that the particles are deposited on the non-transparent substrate, and thus displaying the color of the particles.

Furthermore, the related art includes still another electrophoretic display. In this display, a dispersion liquid including particles is filled into microcapsules colored in a different color from that of the particles. Then, a voltage having the polarity opposite of that of the particles is applied to an electrode disposed on a transparent substrate, whereby the particles are attached to the electrode on the transparent substrate. Thus, the color of the particles is displayed. In contrast, a voltage having the polarity opposite of that of the particles is applied to an electrode disposed on a non-transparent substrate so that the particles are attached to the electrode on the non-transparent substrate, and thus, displaying the color of the microcapsule.

SUMMARY

Various researches for achieving full-color displays has been recently progressed for such an electrophoretic display. In principle, regions in which colors of red, green and blue (RGB) are displayed should be formed in an electrophoretic display, for example. However, it is not easy to manufacture such a full-color electrophoretic display. One cause for this is the difficulty in separately forming RGB regions.

For example, in the case of using a mask member so as to separate RGB regions and dispose microcapsules for each region, the mask member is disposed over microcapsules disposed on a substrate in first, and then microcapsules corresponding to different regions are disposed. Therefore, it is difficult to align the mask member. Also, in the case of using a droplet discharge method so as to separately apply discharge liquids including microcapsules for each of RGB regions, the contact of the discharge liquids with each other is inevitable. As a result, the microcapsules corresponding to different regions are mixed with each other.

Exemplary embodiments of the present invention address the above and/or other problems, and reduce or prevent color mixture between regions displaying different colors.

Thus, an exemplary embodiment provides a method of manufacturing an electrophoretic display that has a display part including an electrophoretic particle electrophoresed by application of an electric field between a pair of substrates. The method includes first disposing a first display part on one of the pair of substrates; and second disposing a second display part that has a different color from that of the first display part on one of the pair of substrates. The first display part is dried before the second display part is disposed.

In an exemplary embodiment of the present invention, the first and second display parts having different colors are prevented from mixing with each other, or such mixing is reduced, since the first display part is dried before the second display part is disposed. Therefore, color mixture between regions displaying different colors can be prevented.

In an exemplary embodiment of the present invention, at least one of the first and second disposing may include removing the first or second display part that has been formed on a base substrate so as to dispose it on one of the pair of substrates.

Typically the display part is formed by drying a predetermined liquid. In the method of manufacturing an electrophoretic display according to an exemplary embodiment of the present invention, the first or second display part formed on the base substrate is removed so as to be disposed on one of a pair of substrates. Therefore, the first or second display part in a dried state can be disposed on one of the substrates. Accordingly, for example, when manufacturing a full-color or area-color electrophoretic display, the display parts disposed on the adjacent pixels can be prevented from mixing with each other. As a result, color mixture between regions displaying different colors can be prevented in the electrophoretic display. Also, for example, it becomes possible to easily dispose the display parts even on a part such as a curved surface, which involves the difficulty in disposition of a function liquid.

In the method of manufacturing an electrophoretic display according to an exemplary embodiment of the present invention, if at least one of the first and second display parts formed on the base substrate is removed so as to be disposed on one of the pair of substrates, the method may include removing only the first or second display part from the base substrate so as to dispose it on one of the pair of substrates. Alternatively, the method may include removing the first or second display part together with the base substrate so as to dispose them on one of the pair of substrates.

In the case of removing the display parts together with the base substrate, it is preferable that an electrode or switching element be previously formed on the base substrate. Such advance formation of an electrode or switching element on the base substrate eliminates the need to form an electrode or switching element after the first or second display part is disposed on one of the pair of substrates, enabling easy manufacturing of an electrophoretic display. In addition, since a substrate to have a switching element thereon is typically subjected to a high temperature atmosphere in a process of forming a switching element, it is difficult to form a switching element on one of the pair of substrates if a flexible substrate of low heat resistance is used as one of the pair of substrates. Thus, a switching element is preferably formed on the base substrate previously like the method of manufacturing an electrophoretic display according to an exemplary embodiment of the present invention.

In this case, therefore, the throughput in manufacturing an electrophoretic display can be improved by removing the display parts corresponding to a plurality of pixel regions from the base substrate at the same time. For example, if pixels of an electrophoretic display are arranged in a strip, the display parts displaying the same color may be arranged extending along a predetermined direction. In this case, therefore, the throughput in manufacturing an electrophoretic display can be improved by removing the display parts corresponding to a plurality of pixel regions from the base substrate at the same time.

In the method of manufacturing an electrophoretic display according to an exemplary embodiment of the present invention, if at least one of the first and second display parts formed on the base substrate is removed so as to be disposed on one of the substrates, at least one of the first and second display parts is preferably formed on a plurality of regions separated from each other on the base substrate. If the display parts are formed on the base substrate in a separated state, it becomes easy to remove the display parts, thereby enhancing or improving the throughput in manufacturing an electrophoretic display. Specifically, partitions corresponding to the regions are disposed on the base substrate, and at least one of the first and second display parts is formed between the partitions. Thereby the display part can be formed on the plurality of regions separated from each other.

In the method of manufacturing an electrophoretic display according to an exemplary embodiment of the present invention, the method may further include disposing the second display part on the other of the pair of substrates, and bonding the other of the pair of substrates on which the second display part has been disposed to one of the pair of substrates.

In the method of manufacturing an electrophoretic display according to an exemplary embodiment of the present invention having such a feature, the first and second display parts are separately disposed on one of the pair of substrates and the other of the pair of substrates, and then these substrates are bonded to each other, thereby manufacturing an electrophoretic display. Compared to a related art manufacturing method of an electrophoretic display that is manufactured by disposing all display parts on one substrate, and then bonding the other substrate to one substrate, the method of manufacturing an electrophoretic display according to this exemplary embodiment of the present invention permits the disposition of the display parts on both of the pair of substrates. Therefore, the number of display parts disposed on one substrate can be reduced to about half of that in a conventional method. Thus, the manufacturing of an electrophoretic display is facilitated.

For example, a disposition region and a non-disposition region are formed on one of the pair of substrates and the other of the pair of substrates. In this case, the first display part or the second display part may be disposed on the disposition region and may not be disposed on the non-disposition region. The non-disposition region may have substantially the same periphery as that of the disposition region. One of the pair of substrates is bonded to the other of the pair of substrates while the disposition region on one of the pair of substrates faces the non-disposition region on the other of the pair of substrates. In this case, if one display region is defined as one pixel of an electrophoretic display, when disposing the display parts on one of the pair of substrates and the other of the pair of substrates, the display parts can be disposed on one of the pair of substrates and the other of the pair of substrates without contacting different pixels with each other. Accordingly, one substrate and the other substrate can be bonded to each other after the first and second display parts are solidified by baking, or the like, to an extent that the display parts disposed on different substrates become immiscible with each other. Thus, color mixture between regions displaying different colors can be reduced or prevented.

In the method of manufacturing an electrophoretic display according to an exemplary embodiment of the present invention, if the second disposing includes bonding the other substrate on which the second display part has been disposed to one of the pair of substrates, the disposition region and the non-disposition region may be formed by disposing a masking material on the substrate, and then disposing the first or second display part on the substrate with intermediary of the masking material, and thereafter removing the masking material. Alternatively, the disposition region and the non-disposition region may be formed by disposing a mask member on the substrate, and then disposing the first or second display part on the substrate with an intermediary of the mask member, and thereafter taking the mask member away. The term masking material here refers to a material to cover non-disposition regions that is not used repeatedly. For example, a tape or a hydrophobic surface treating agent can be used as the masking material. Meanwhile, the mask member refers to a mold having openings for disposition regions that can be used repeatedly.

In the method of manufacturing an electrophoretic display according to an exemplary embodiment of the present invention, if the second disposing includes bonding the other substrate on which the second display part has been disposed to one of the pair of substrates, one of the pair of substrates and the other of the pair of substrates are preferably bonded to each other by pressure-bonding. The first and second display parts are pressed so as to be deformed by pressure-bonding one of the pair of substrates and the other of the pair of substrates. Therefore, even when there are slight gaps between the first display parts formed on one of the pair of substrates and the second display parts formed on the other of the pair of substrates, these gaps can be buried.

In the method of manufacturing an electrophoretic display according to an exemplary embodiment of the present invention, if the second disposing includes bonding the other of the pair of substrates on which the second display part has been disposed to one of the pair of substrates, the disposition region and the non-disposition region may be formed so as to be disposed in a strip. By arranging the disposition regions and non-disposition regions in a strip, an electrophoretic display having pixels arranged in a strip can be manufactured, for example.

In the method of manufacturing an electrophoretic display according to an exemplary embodiment of the present invention, each of the first and second display parts may be selected from a red display part displaying red or white color, a green display part displaying green or white color, a blue display part displaying blue or white color, and a black display part displaying black or white color. For example, if the electrophoretic display includes the red display part, the green display part and the blue display part, it can be used as a full-color electrophoretic display. In addition, if the black display part is further included, the contrast of displayed images in the electrophoretic display can be improved. Meanwhile, if the electrophoretic display includes the red display part and the blue display part, it can be used as an area-color electrophoretic display.

In the method of manufacturing an electrophoretic display according to an exemplary embodiment of the-present invention, the first and second display parts may have a microcapsule in which the electrophoretic particle is enclosed. In the electrophoretic display having such a feature and manufactured by the method of manufacturing an electrophoretic display according to this exemplary embodiment of the present invention, microcapsules including electrophoretic particles are disposed between the substrates as the display parts.

In the method of manufacturing an electrophoretic display according to an exemplary embodiment of the present invention, the display part may include at least two of a red display part displaying red or white color, a green display part displaying green or white color, a blue display part displaying blue or white color, and a black display part displaying black or white color. The display part of each color may be formed on the different substrates from each other. For example, if the electrophoretic display includes the red display part, the green display part and the blue display part, it can be used as a full-color electrophoretic display. In addition, if the black display part is further included, the contrast of displayed images in the electrophoretic display can be improved. Meanwhile, if the electrophoretic display includes the red display part and the blue display part for example, it can be used as an area-color electrophoretic display. In addition, since each display part is formed on each of the different base substrates, color mixture between regions displaying different colors can be prevented.

In the method of manufacturing an electrophoretic display according to an exemplary embodiment of the present invention, the display part may have a microcapsule in which the electrophoretic particle is enclosed. In the electrophoretic display having such a feature according to this exemplary embodiment of the present invention, microcapsules including electrophoretic particles are disposed between the substrates as the display parts.

DETAILED DESCRIPTION OF EMBODIMENTS

Figure 1:
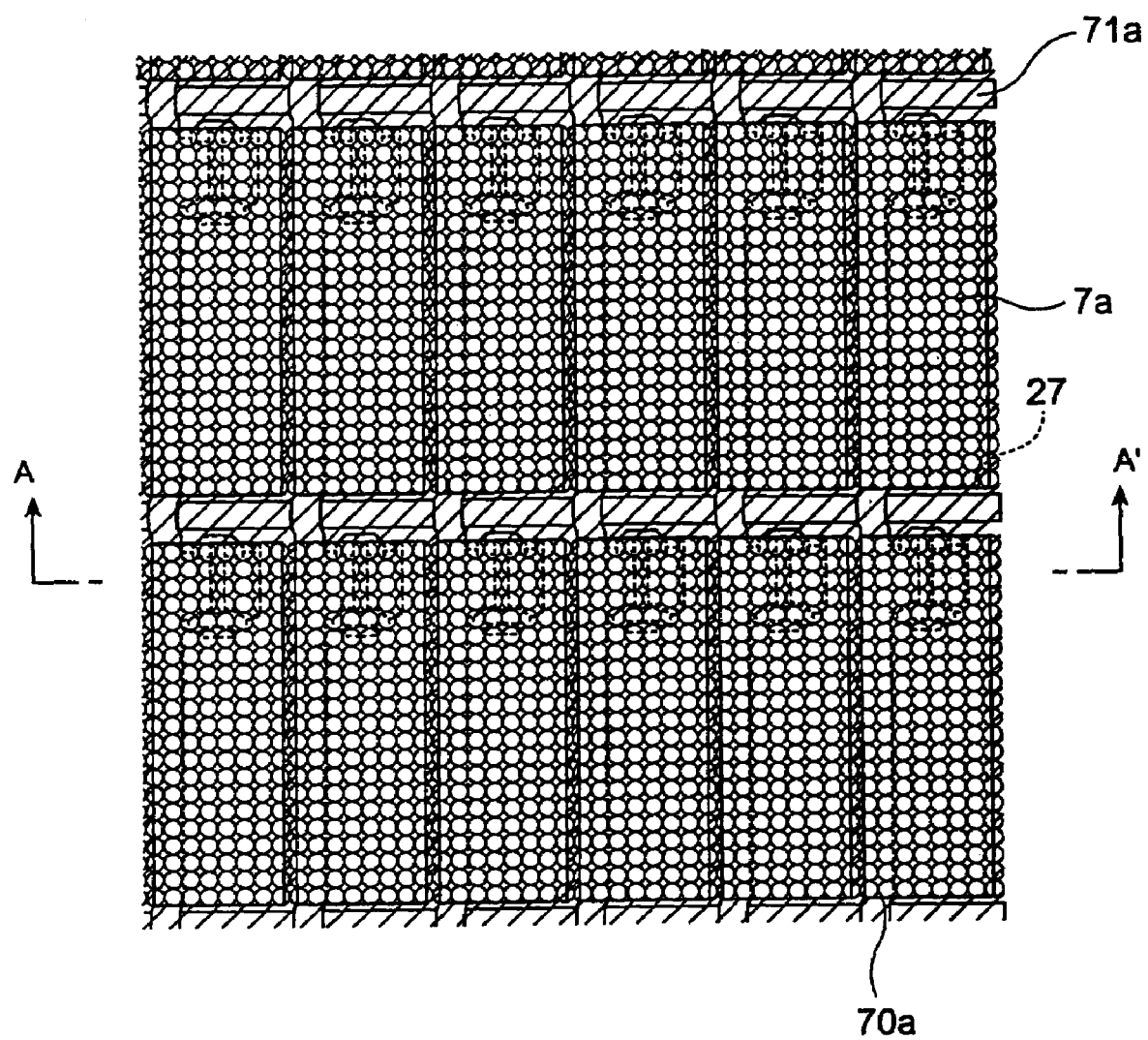
FIG. 1 is a schematic showing the structure of an electrophoretic display according to one exemplary embodiment of the present invention.

An exemplary embodiment according to the present invention of a method of manufacturing an electrophoretic display will now be described below with reference to the drawings. In the drawings, the scale of members and layers is adequately changed in order to illustrate the members and layers in a recognizable size.

First Exemplary Embodiment

Figure 2:
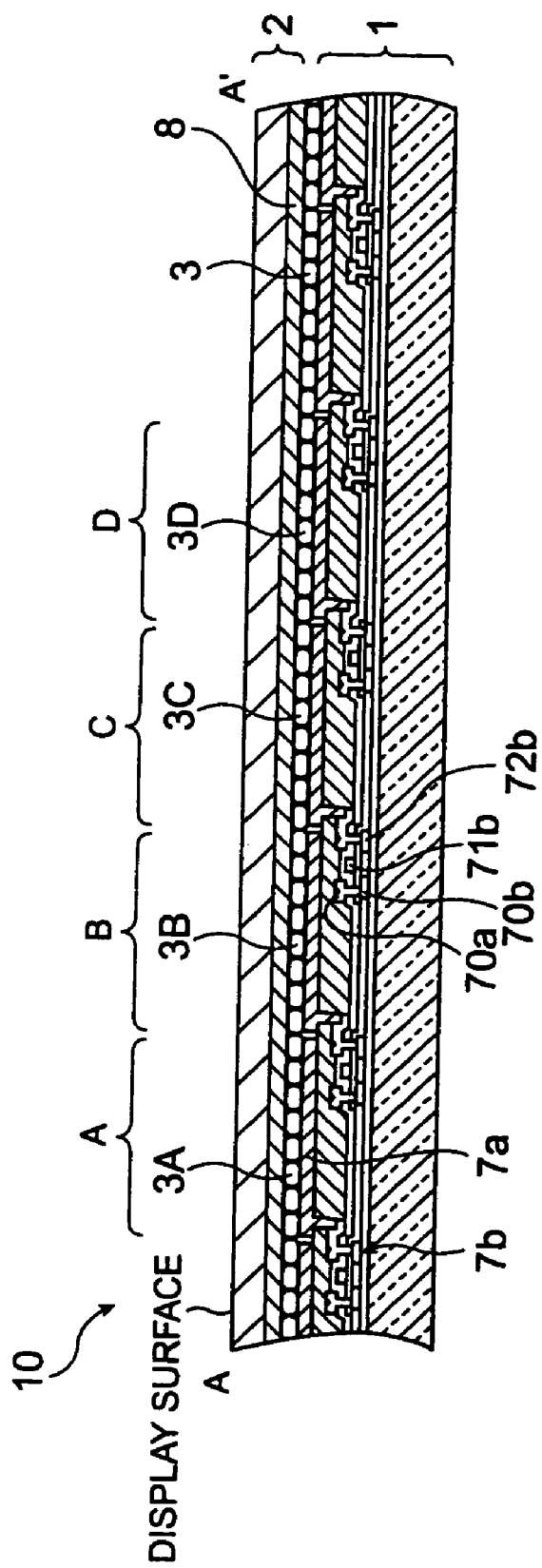
FIG. 2 is a schematic showing the structure of an electrophoretic display according to an exemplary embodiment of the present invention.

FIGS. 1 and 2 are schematics showing the structure of an electrophoretic display in a first exemplary embodiment. FIG. 2 is a schematic showing a section taken along the line A–A' of FIG. 1.

As shown in FIG. 2, an electrophoretic display 10 in the first exemplary embodiment includes a first substrate 1 (one substrate), a second substrate 2 (other substrate) that face each other, and a display part 3 between the first and second substrates 1 and 2.

The second substrate 2 is formed of a substrate having optical transparency such as transparent glass or a transparent film. A common electrode 8 composed of a transparent conductive material, such as indium tin oxide (ITO) is formed on the inner side (display part 3 side) of the second substrate 2. In the electrophoretic display 10 of the present exemplary embodiment, the outer surface of the second substrate 2 is a display surface.

The first substrate 1 need not necessarily be transparent. For example, besides a glass substrate and a resin film substrate, a metal plate such as a stainless plate having an insulating layer formed thereon, etc., can be formed as the first substrate 1. As shown in FIGS. 1 and 2, a plurality of scanning lines 71a and a plurality of data lines 70a are formed on the first substrate 1 along the row direction and column direction, respectively, in a manner to be isolated from each other. Pixel electrodes 7a and TFT elements (switching elements) 7b to control a current to the pixel electrodes 7a are formed in pixel regions separated in a matrix by the scanning lines 71*a* and the data lines 70*a*. A display region is constituted by the plurality of pixel regions arranged in a matrix.

Each of the data lines 70*a* is electrically connected to a source 70*b* of the TFT element 7*b*. Image signals are supplied to each of the data lines 70*a* line-sequentially, or are supplied to each group of the plural data lines 70*a* adjacent to each other. Meanwhile, the scanning line 71*a* is electrically connected to a gate of the TFT element 71*b*, and scanning signals are pulsatively supplied at predetermined timing to the plurality of scanning lines 71*a* line-sequentially. The pixel electrode 7*a* is electrically connected to a drain 72*b* of the TFT element 7*b*. A pulse voltage is applied to the gate 71*b* to switch the TFT element 7*b* on for a certain period, whereby image signals supplied from the data line 70*a* are written in the pixel electrode 7*a* at a predetermined timing. This permits displaying in each pixel region.

The first substrate 1 and the second substrate 2 are sealed with a sealing member (not shown) that is formed in a frame shape in a manner to surround the periphery of the display region, and are held at a certain distance from each other with a spacer (not shown) therebetween. In the electrophoretic display 10 of the first exemplary embodiment, the display part 3 is disposed in the closed space formed by the substrates 1 and 2, and the sealing member.

As shown in FIG. 2, the display surface of the electrophoretic display 10 in this first exemplary embodiment is constituted by disposing, in a strip manner, a plurality of red display regions A displaying red or white color, a plurality of green display regions B displaying green or white color, a plurality of blue display regions C displaying blue or white color, and a plurality of black display regions D displaying black or white color.

The display parts 3 for displaying each color are disposed on the positions corresponding to each of the regions A through D between the substrates 1 and 2. Specifically, a plurality of red display parts 3A displaying red or white color is disposed on a region corresponding to the red display regions A, between the substrates 1 and 2, while being fixed with resin and so forth. Also, a plurality of green display parts 3B displaying green or white color is disposed on a region corresponding to the green display regions B, between the substrates 1 and 2, while being fixed with resin and so forth. A plurality of blue display parts 3C displaying blue or white color is disposed on a region corresponding to the blue display regions C, between the substrates 1 and 2, while being fixed with resin and so forth. In addition, a plurality of black display parts 3D displaying black or white color is disposed on a region corresponding to the black display regions D, between the substrates 1 and 2, while being fixed with resin and so forth.

Figure 3:
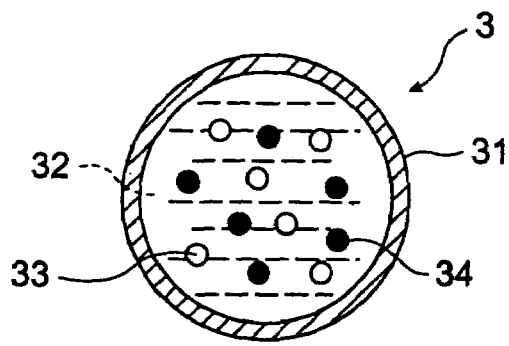
FIG. 3 is a schematic showing the structure of a display part in an exemplary embodiment of the present invention.
Figure 4A:
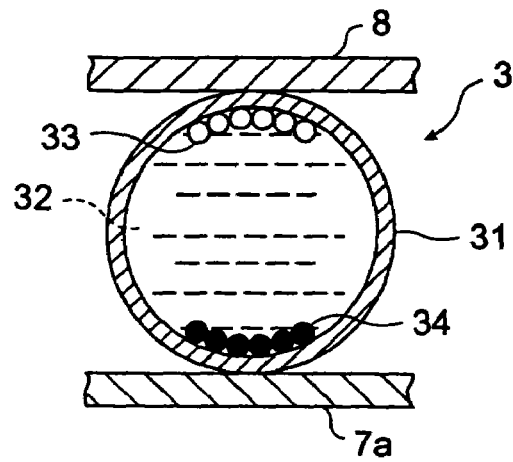
FIGS. 4A and 4B are schematics illustrating a displaying method of a display part in an exemplary embodiment of the present invention.
Figure 4B:
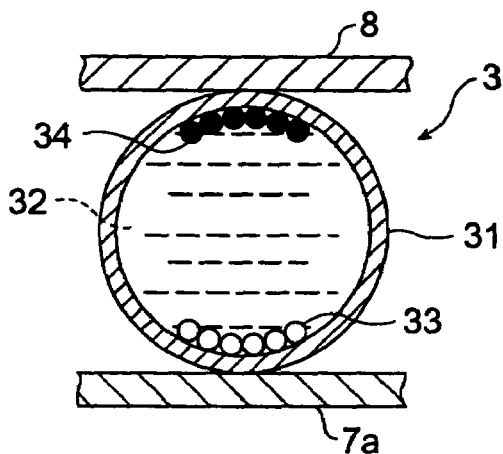

Subsequently, the structure of the display part 3 described above and a displaying-method thereof will now be described with reference to FIGS. 3–4B. FIG. 3 is an enlarged view of the vicinity of the display part 3. FIGS. 4A and 4B illustrate a displaying method of the display part 3.

As shown in FIG. 3, the display part 3 includes a microcapsule 31, a dispersion liquid 32 filled into the microcapsule 31, white particles 33, and colored particles 34. The diameter of the microcapsule 31 is about 50 micrometers, for example. The white particles 33 are positively charged. The colored particles 34 are negatively charged. These particles 33 and 34 are dispersed in the dispersion liquid 32. The colored particles 34 are colored in red, green, blue and black, in the red display parts 3A, the green display parts 3B, the blue display parts 3C and the black display parts 3D, respectively.

The microcapsule 31 is composed of acrylic resin such as poly (methyl methacrylate) or poly (ethyl methacrylate), urea resin and high-molecular-weight resin such as gum arabic.

As the dispersion liquid 32, a single or a mixture of the following materials to which a surfactant is added can be used for example: water; an alcohol solvent such as methanol, ethanol, isopropanol, butanol, octanol or methyl cellosolve; an ester such as ethyl acetate or butyl acetate; a ketone such as acetone, methyl ethyl ketone or methyl isobutyl ketone; an aliphatic hydrocarbon such as pentane, hexane or octane; an alicyclic hydrocarbon such as cyclohexane or methylcyclohexane; an aromatic hydrocarbon having long-chain alkyl groups such as benzene, toluene, xylene, hexylbenzene, butylbenzene, octylbenzene, nonylbenzene, decylbenzene, undecylbenzene, dodecylbenzene, tridecylbenzene or tetradecylbenzen; a halogenated hydrocarbon such as methylene chloride, chloroform, carbon tetrachloride or 1,2-dichloroethane; carboxylates; or other various oils.

The white particles 33 and the colored particles 34 are organic or inorganic particles (high molecule or colloid) having the characteristics of moving based on electrophoresis due to a potential difference in the dispersion liquid 32. Specifically, as the white particles 33, for example, white pigments such as titanium dioxide, zinc oxide or antimony trioxide can be used. Meanwhile, as the colored particles 34, the following pigments can be used: black pigments such as aniline black or carbon black; azo pigments such as monoazo, disazo or polyazo; yellow pigments such as isoindolinone, chrome yellow, yellow iron oxide, cadmium yellow, titanium yellow or antimony; azo pigments such as monoazo, disazo or polyazo; red pigments such as quinacridone red or chrome vermillion; blue pigments such as phthalocyanine blue, indanthrene blue, anthraquinone dyes, prussian blue, ultramarine blue or cobalt blue;, or green pigments such as phthalocyanine green. In addition, if necessary, the following agents can be added to these pigments: a charge controlling agent formed of particles of an electrolyte, surfactant, metal soap, resin, rubber, oil, varnish, compound or the like; a dispersion agent such as a titanium coupling agent, aluminum coupling agent or silane coupling agent; a lubricating agent; and a stabilizing agent.

Then, for example, when a voltage is applied to the pixel electrode 7*a* so that the pixel electrode 7*a* becomes negative, the colored particles 34 positively charged are attracted toward the pixel electrode 7*a* while the white particles 33 negatively charged are attracted toward the common electrode 8, by means of Coulomb force as shown in FIG. 4A. In this case, therefore, white color is displayed on the display surface. In contrast, when a voltage is applied to the pixel electrode 7*a* so that the pixel electrode 7*a* becomes positive, the white particles 33 negatively charged are attracted toward the pixel electrode 7*a* while the colored particles 34 positively charged are attracted toward the common electrode 8, by means of Coulomb force as shown in FIG. 4B. In this case, therefore, the color of the colored particles 34 is displayed on the display surface.

In exemplary embodiments, various methods can be used as a manufacturing method of such a display part 3. One example thereof will now be described. First, the white particles 33 and the colored particles 34 are dispersed in the dispersion liquid 32 such as dodecylbenzene. Thereafter, the dispersion liquid 32 is dropped in a solution obtained by dissolving gum arabic and gelatin. Then, the pH of the solution is adjusted with acetic acid or the like, and then the solution is iced to precipitate capsule agents. Subsequently, formaldehyde and sodium carbonate are added to the solution to form cross-linking, whereby microcapsules (display parts 3) are formed in the solution. Then, stirring is carried on for a certain period, and thereafter the display parts 3 are taken from the solution by classifying. The diameter of the microcapsule thus manufactured is about 50 micrometers.

Next, a method of manufacturing an electrophoretic display according to the first exemplary embodiment will now be described with reference to FIGS. 5A–6E. In FIGS. 6D and 6E, the illustration of the common electrode 8, the pixel electrode 7a, the data line 70a, the source 70b, the TFT element 71b and the drain 72b is omitted. Also, for convenience of the description, in FIG. 5C and the subsequent drawings, the display part 3 is illustrated as a layer and the illustration of each microcapsule is omitted.

Figure 5A:
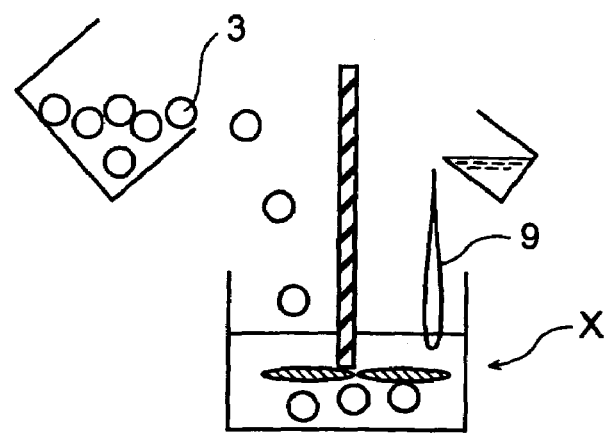
FIGS. 5A–5C are schematics illustrating a method of manufacturing an electrophoretic display according to an exemplary embodiment of the present invention.
Figure 6D:
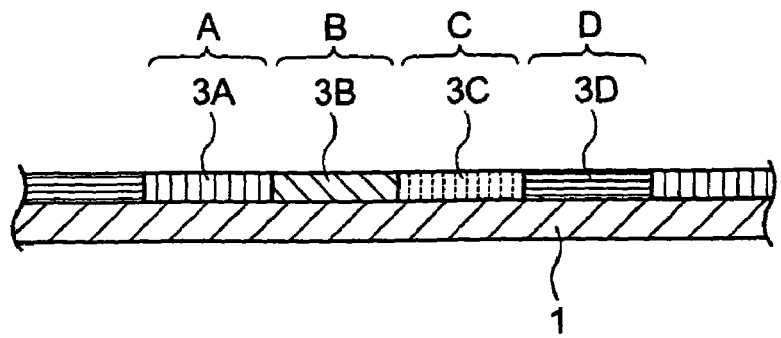
FIGS. 6D and 6E are schematics illustrating the method of manufacturing an electrophoretic display according to an exemplary embodiment of the present invention.
Figure 6E:
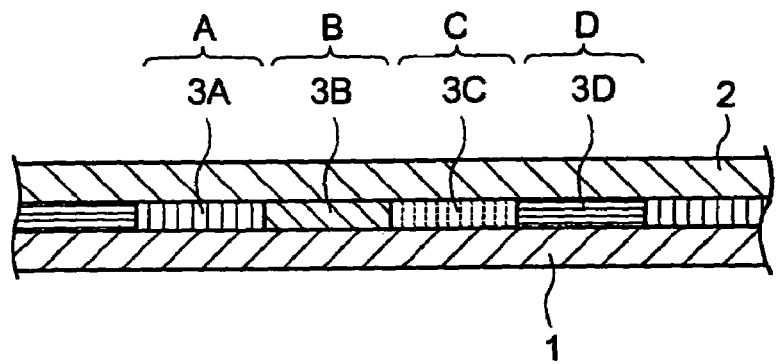

First, as shown in FIG. 5A, the display parts 3 are mixed with a binder 9, and thereby slurry X, including the display parts 3, is obtained. An emulsion adhesive or the like can be used as the binder 9. This slurry X is generated for each of the display parts 3A through 3D. In the following description, the slurry X including the red display parts 3A, the green display parts 3B, the blue display parts 3C and the black display parts 3D is referred to as slurry XA, slurry XB, slurry XC and slurry XD, respectively.

Figure 5B:
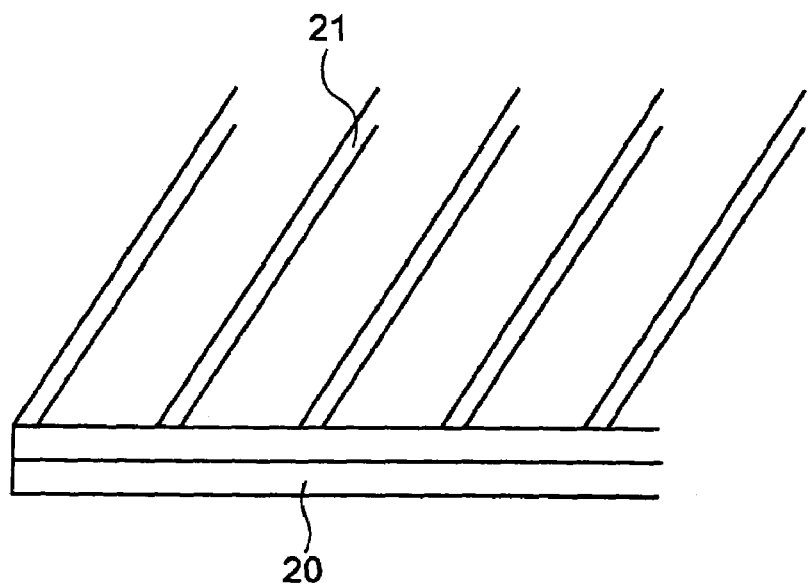
Figure 5C:
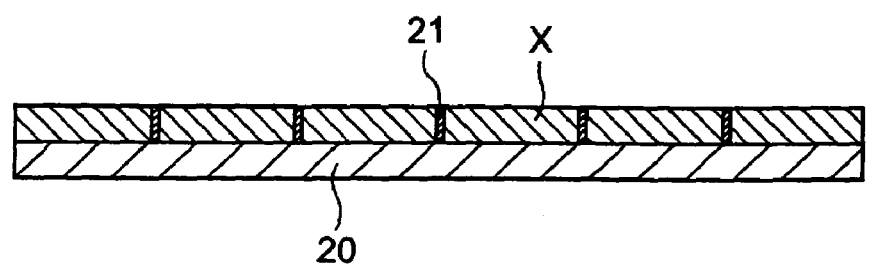

Next, the display parts 3A through 3D corresponding to the areas of the display regions A through D are formed on a base substrate 20. Specifically, as shown in FIG. 5B, partitions 21 are disposed on the base substrate 20 so that one surface of the base substrate 20 is divided into a plurality of regions having the area corresponding to that of the display regions A through D. Subsequently, as shown in FIG. 5C, the slurry X is disposed between the partitions 21 on the base substrate 20. Then the base substrate 20 is dried at a predetermined temperature for a predetermined period, and furthermore is fixed with resin or the like, thereby forming the display parts 3. Thereafter, the display parts 3 are removed, whereby the display parts 3 having the area corresponding to that of the display regions A through D are obtained. The display parts 3A through 3D are formed on the different base substrates 20 from each other. Therefore, the display parts 3A through 3D can be formed without the mixing of the slurry XA through XD with each other.

The base substrate 20 and the partitions 21 are preferably formed of a lyophobic member. The formation of the base substrate 20 and the partitions 21 with a lyophobic member permits easy removal of the display parts 3 from the base substrate 20. A fluorine member, polyethylene resin, polypropylene resin, a metal or the like can be used as such a lyophobic member. Alternatively, for example, fluorine coating may be implemented for the surfaces of the base substrate 20 and the partitions 21 that are made of plastic.

Moreover, in order to achieve the thinned electrophoretic display 10 having an improved emission characteristic, the display parts 3 are preferably constituted by a single layer of the microcapsules 31. The display parts 3 of a single layer can be achieved by, for example, using a so-called doctor blade method. In this method, a given blade is moved in the extending direction of the display regions A through D to remove the extra display parts 3.

Next, as shown in FIG. 6D, the display parts 3A through 3D formed in the above manner are disposed on the first substrate 1. Specifically, on the first substrate 1, the red display parts 3A are disposed on the regions corresponding to the red display regions A with an adhesive, while the green display parts 3B are disposed on the regions corresponding to the green display regions B with an adhesive. In addition, the blue display parts 3C are disposed on the regions corresponding to the blue display regions C with an adhesive, while the black display parts 3D are disposed on the regions corresponding to the black display regions D with an adhesive.

Thereafter, as shown in FIG. 6E, the second substrate 2 is bonded to the first substrate 1 on which the display parts 3A through 3D have been disposed, and then the first substrate 1 and the second substrate 2 are sealed with a sealing member. Then, the scanning lines 71a, the data lines 70a and the common electrode 8 are connected to an external driver and so forth, thereby manufacturing the electrophoretic display 10 shown in FIGS. 1 and 2.

In the method of manufacturing the electrophoretic display 10 according to the first exemplary embodiment, the display parts 3A through 3D are formed on the base substrate 20 first, and thereafter being disposed on the first substrate 1. Therefore, the slurry XA through XD does not contact each other. Specifically, for example, when the green display part 3B as a second display part is disposed on the first substrate 1, the red display part 3A as a first display part has been dried. Accordingly, the display parts 3A through 3D can be prevented from mixing with each other, and it becomes possible to prevent color mixture between the regions displaying different colors. Also, when the blue display part 3C is disposed on the first substrate 1, the red display part 3A and the green display part 3B that have been previously disposed on the first substrate 1 are constituted as the first display part of the present invention, while the blue display part 3C is constituted as the second display part. Also, the step of disposing the red display part 3A and the green display part 3B on the first substrate 1 is defined as a first step, while the step of disposing the blue display part 3C on the first substrate 1 is defined as a second step. Meanwhile, when the black display part 3D is disposed on the first substrate 1, the red display part 3A, the green display part 3B and the blue display part 3C, that have been previously disposed on the first substrate 1, are constituted as the first display part of the present invention, while the black display part 3D is constituted as the second display part. Also, the step of disposing the red display part 3A, the green display part 3B and the blue display part 3C on the first substrate 1 is defined as the first step, while the step of disposing the black display part 3D on the first substrate 1 is defined as the second step.

Next, examples of electronic apparatuses including the electrophoretic display 10 manufactured by the above manufacturing method will be described with reference to FIGS. 7 through 10.

Figure 7:
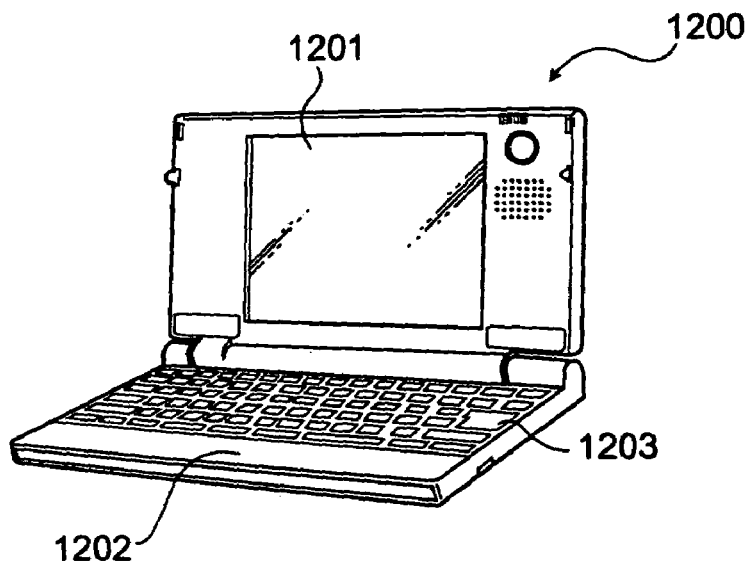
FIG. 7 is a schematic showing an example of electronic apparatuses in an exemplary embodiment of the present invention.

FIG. 7 is a perspective view showing the structure of a mobile (portable) personal computer. A personal computer 1200 includes the electrophoretic display of the present invention as a display 1201. The personal computer 1200 also includes a body 1202 including a keyboard 1203.

Figure 8:
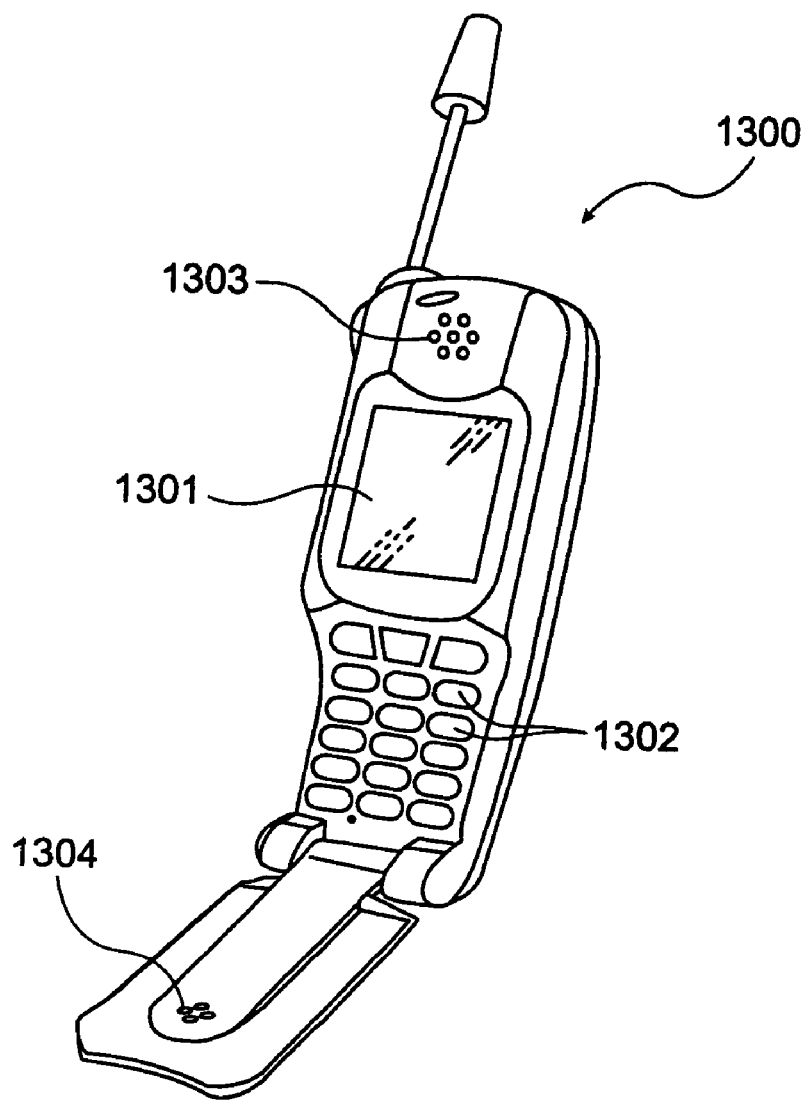
FIG. 8 is a schematic showing an example of electronic apparatuses in an exemplary embodiment of the present invention.

FIG. 8 is a perspective view showing the structure of a cellular phone. A cellular phone 1300 includes the electrophoretic display as a small size display 1301. The cellular phone 1300 includes a plurality of operation buttons 1302, an earpiece 1303 and a mouthpiece 1304.

Figure 9:
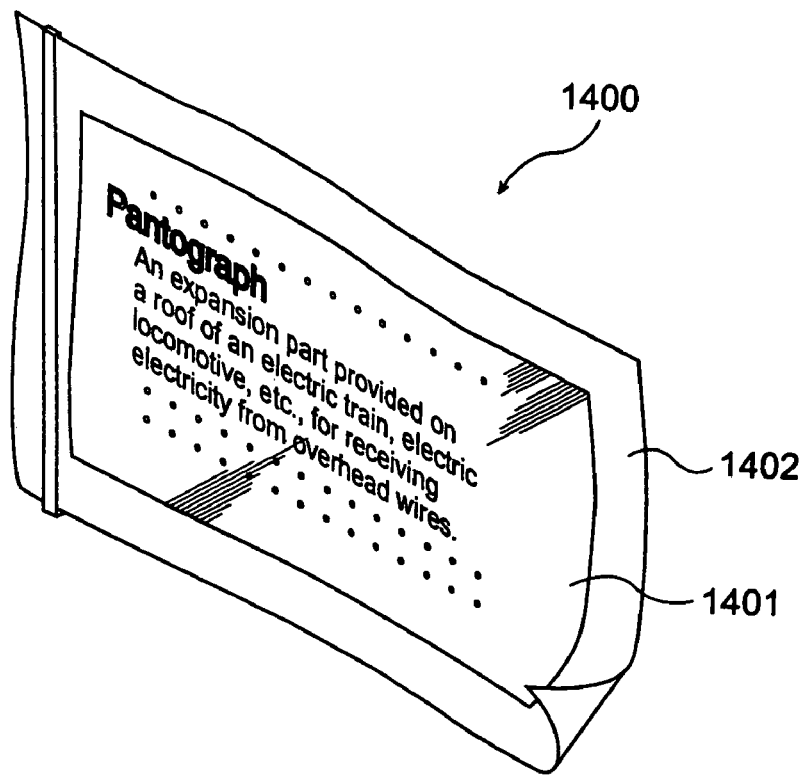
FIG. 9 is a schematic showing an example of electronic apparatuses in an exemplary embodiment of the present invention.

FIG. 9 is a perspective view showing the structure of an electronic paper. An electronic paper 1400 includes the electrophoretic display as a display 1401. The electronic paper 1400 includes a body 1402 formed of a rewritable sheet that has the same texture and flexibility as those of a conventional paper.

Figure 10:
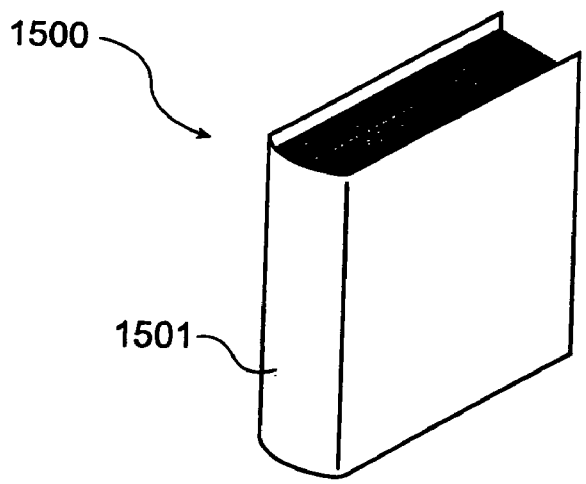
FIG. 10 is a schematic showing an example of electronic apparatuses in an exemplary embodiment of the present invention.

FIG. 10 is a perspective view showing the structure of an electronic notebook. An electronic notebook 1500 is formed by bundling a plurality of electronic papers 1400 shown in FIG. 9 and sandwiching the electronic papers 1400 with a cover 1501. The cover 1501 includes a display data input device (not shown) that inputs display data sent from an external device, for example. According to this, the displayed content can be changed and renewed in response to the display data while the electronic papers are still bundled.

In addition to the examples described above, liquid crystal televisions, video tape recorders of viewfinder types or monitor viewing types, car navigation devices, pagers, personal digital assistants, electric calculators, word processors, work stations, picture phones, POS terminals, apparatuses equipped with a touch panel and so forth can be cited as further examples thereof. An electrophoretic display manufactured by the method of manufacturing an electrophoretic display according to the first exemplary embodiment can also be applied to a display of such an electronic apparatus.

Second Exemplary Embodiment

Figure 11A:
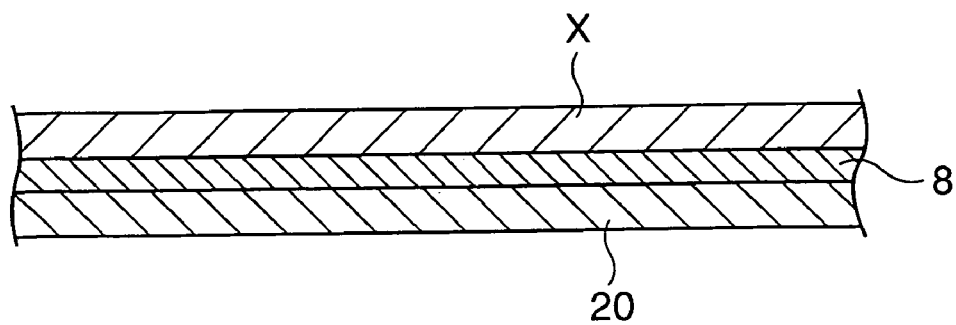
FIGS. 11A–11B are schematics illustrating a method of manufacturing an electrophoretic display according to an exemplary embodiment of the present invention.
Figure 11B:
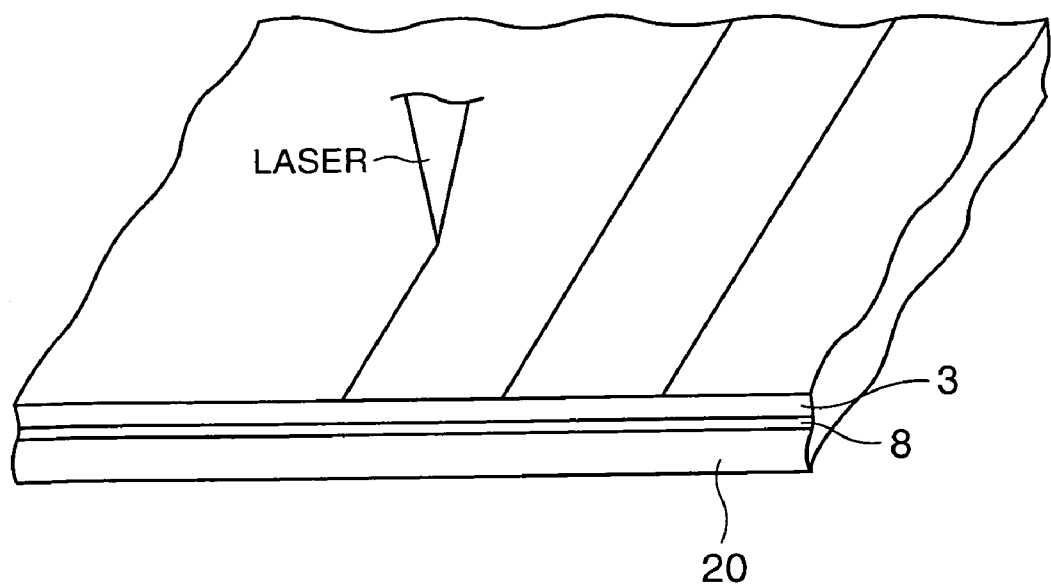

A second exemplary embodiment of the method of manufacturing an electrophoretic display according to the present invention will be described referring to FIGS. 11A and 11B. In the description of the second exemplary embodiment, the description of the same parts as those in the first exemplary embodiment will be omitted or simplified.

In the first exemplary embodiment, only the display parts 3 are removed from the base substrate 20 so as to be disposed on the first substrate 1. The method of manufacturing an electrophoretic display according to the second exemplary embodiment is different from the first exemplary embodiment in that the display parts 3 together with the base substrate 20 are removed so as to be disposed on the first substrate 1.

Specifically, each slurry XA through XD is disposed on the different base substrates 20, and then each base substrate 20 is dried at a predetermined temperature for a predetermined period. Moreover, each slurry is fixed with resin or the like, thereby forming the display parts 3 on the base substrate 20 as shown in FIG. 11A. In the second exemplary embodiment, as shown in FIG. 11A, the common electrode 8 is formed on the base substrate 20. Then, as shown in FIG. 11B, the display parts 3 with the base substrate 20 are cut (removed) by using laser, for example. Then, each display part 3A through 3D cut together with the base substrate 20 is disposed, with an adhesive, on regions on the first substrate 1 that correspond to each display region A through D, and thereafter the common electrodes 8 are electrically connected to each other. By thus cutting the display parts 3A through 3D together with the base substrate 20 and then disposing them on the first substrate 1, the base substrate 20 is used as the second substrate 2 shown in the first exemplary embodiment. Thereafter, the first substrate 1 on which the display parts 3 cut together with the base substrate have been disposed is sealed with a sealing member, while the scanning lines 71a, the data lines 70a and the common electrode 8 are connected to an external driver and so forth. Thus, the electrophoretic display 10, shown in FIGS. 1 and 2, is manufactured.

As described above, the method of manufacturing an electrophoretic display according to the exemplary embodiments of the present invention can also be applied to a manufacturing method in which the display parts 3 are cut together with the base substrate 20 so as to be disposed on the first substrate 1. In addition, in the method of manufacturing an electrophoretic display according to the second exemplary embodiment, the common electrodes 8 are previously formed on the base substrate 20. Therefore, the throughput in manufacturing the electrophoretic display 10 can be improved compared to the first exemplary embodiment. In the method of manufacturing an electrophoretic display according to the second exemplary embodiment, the display parts 3 are not removed from the base substrate 20. Thus, the base substrate 20 does not need to be formed of a lyophobic member.

Third Exemplary Embodiment

A third exemplary embodiment of the method of manufacturing an electrophoretic display according to the present invention will be described referring to FIGS. 12A through 14G. In the description of the third exemplary embodiment, the description of the same parts as those in the first exemplary embodiment will be omitted or simplified.

Figure 12A:
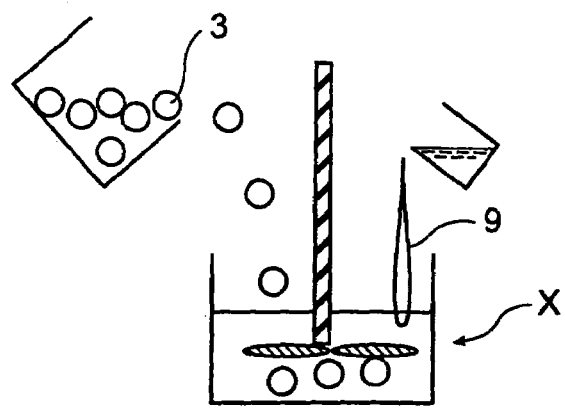
FIGS. 12A–12C are schematics illustrating a method of manufacturing an electrophoretic display according to an exemplary embodiment of the present invention.

First, as shown in FIG. 12A, the display parts 3 are mixed with the binder 9, and thereby slurry X including the display parts 3 is obtained in the same manner as the first exemplary embodiment. An emulsion adhesive or the like can be used as the binder 9. This slurry X is generated for each of the display parts 3A through 3D. In the following description, the slurry X including the red display parts 3A, the green display parts 3B, the blue display parts 3C and the black display parts 3D is referred to as the slurry XA, the slurry XB, the slurry XC and the slurry XD, respectively.

Figure 12B:
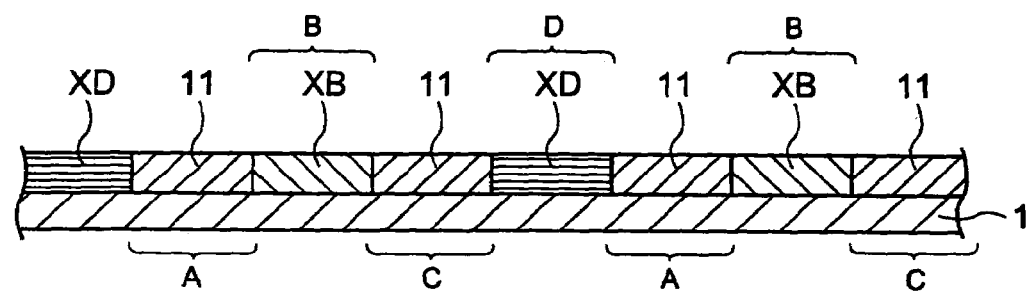

Next, as shown in FIG. 12B, masking materials 11 are disposed on the first substrate 1 on which the data lines 70a, the sources 70b, the TFT elements 71b and the drains 72b have been previously formed, and then the slurry X, including the display parts 3, is disposed on the first substrate 1 with the intermediary of the masking materials 11. Specifically, the masking materials 11 are disposed on regions on the first substrate 1 that correspond to the red display regions A and the blue display regions C, while the slurry XB is disposed on the regions corresponding to the green display regions B, and the slurry XD is disposed on the regions corresponding to the black display regions D. By thus disposing the masking materials 11 on regions on the first substrate 1 that correspond to the red display regions A and the blue display regions C, the masking materials 11 are disposed on every other display region. Therefore, the slurry X is prevented from mixing with the adjacent display regions. A tape, a hydrophobic surface treating agent or the like can be used as the masking materials 11.

Figure 12C:
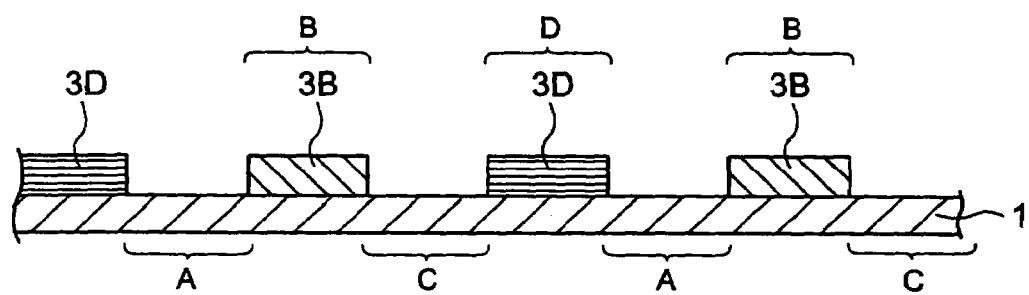

Subsequently, drying treatment is implemented for the first substrate 1 at a predetermined temperature for a predetermined period, and then the display parts 3 are fixed with resin or the like. Furthermore, the masking materials 11 are removed, whereby as shown in FIG. 12C, the green display parts 3B are disposed on regions on the first substrate 1 that correspond to the green display regions B, and the black display parts 3D are disposed on regions corresponding to the black display regions D (first step). In this third exemplary embodiment, since the green display parts 3B are disposed on regions on the first substrate 1 that correspond to the green display regions B, and the black display parts 3D are disposed on regions corresponding to the black display regions D, the regions on the first substrate 1 that correspond to the green display regions B and the black display regions D are defined as disposition regions of the present invention, while the regions on the first substrate 1 that correspond to the red display regions A and the blue display regions C are defined as non-disposition regions. Also, in the present embodiment, since the first substrate 1 is bonded to the second substrate 2 by pressure-bonding, the display parts 3 are pressed so as to be spread on the substrate. Therefore, in an exemplary embodiment, that non-disposition regions are slightly larger than disposition regions in area. Thus, the masking materials 11 are disposed so as to have a slightly larger area than that of the regions on the first substrate 1 that correspond to the red display regions A and the blue display regions C.

Figure 13D:
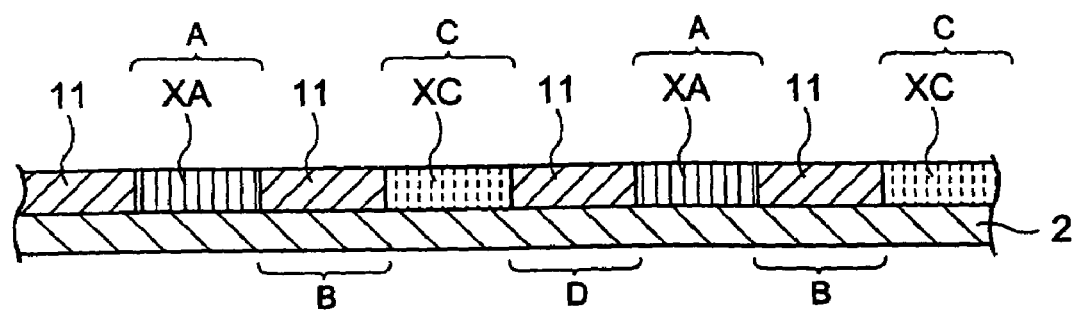
FIGS. 13D–13F are schematics illustrating the method of manufacturing an electrophoretic display according to an exemplary embodiment of the present invention.

Next, as shown in FIG. 13D, the masking materials 11 are disposed on the second substrate 2 on which the common electrode 8 has been previously formed, and then the slurry X including the display parts 3 is disposed on the first substrate 1 with the intermediary of the masking materials 11. Specifically, the masking materials 11 are disposed on regions on the second substrate 2 that correspond to the green display regions B and the black display regions D), while the slurry XA is disposed on regions corresponding to the red display regions A, and the slurry XC is disposed on regions corresponding to the blue display regions C. By thus disposing the masking materials 11 on regions on the second substrate 2 that correspond to the green display regions B and the black display regions D, the masking materials 11 are disposed on every other display region. Therefore, the slurry X is prevented from mixing with the adjacent display regions.

Figure 13E:
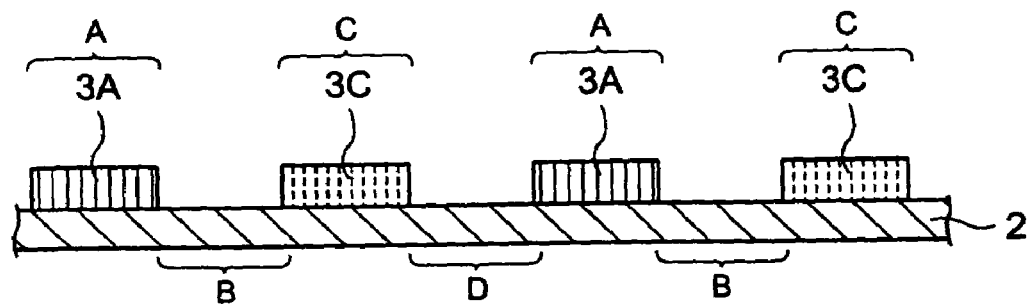

Subsequently, drying treatment is implemented for the second substrate 2 at a predetermined temperature for a predetermined period. Furthermore, the masking materials 11 are removed, whereby as shown in FIG. 13E, the red display parts 3A are disposed on regions on the second substrate 2 that correspond to the red display regions A, and the blue display parts 3C are disposed on regions corresponding to the blue display regions C (first step). In this third exemplary embodiment, since the red display parts 3A are disposed on regions on the second substrate 2 that correspond to the red display regions A, and the blue display parts 3C are disposed on regions corresponding to the blue display regions C, the regions on the second substrate 2 that correspond to the red display regions A and the blue display regions C are defined as disposition regions, while the regions on the second substrate 2 that correspond to the green display regions B and the black display regions D are defined as non-disposition regions. Also, in this third exemplary embodiment, similarly to the first substrate 1, non-disposition regions preferably have a slightly larger area than that of disposition regions. Thus, the masking materials 11 are preferably disposed so as to have a slightly larger area than that of the regions on the first substrate 2 that correspond to the green display regions B and the black display regions D.

In order to achieve the thinned electrophoretic display 10 having an improved emission characteristic, the display parts 3 disposed on regions corresponding to the display regions A through D are preferably disposed as a single layer. The display parts 3 of a single layer can be achieved by, for example, using a so-called doctor blade method. In this method, a given blade is moved in the extending direction of the display regions A through D to remove the extra display parts 3.

Figure 13F:
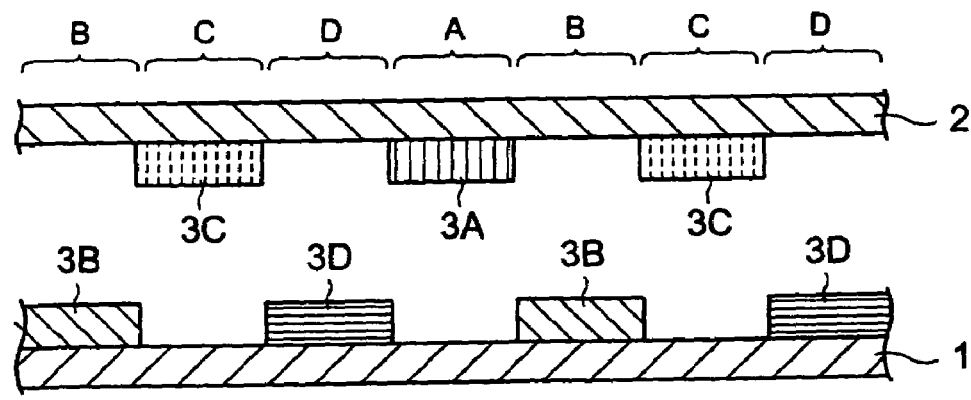

Next, the first substrate 1 is bonded to the second substrate 2 by pressure-bonding (second step). Specifically, as shown in FIG. 13F, the green display parts 3B (disposition regions) on the first substrate 1 is opposed to regions (non-disposition regions) on the second substrate 2 that correspond to the green display regions B, while the black display parts 3D (disposition regions) on the first substrate 1 is opposed to regions (non-disposition regions) on the second substrate 2 that correspond to the black display regions D. Also, the red display parts 3A (disposition regions) on the second substrate 2 are opposed to regions (non-disposition regions) on the first substrate 1 that correspond to the red display regions A, while the blue display parts 3C (disposition regions) on the second substrate 2 are opposed to regions (non-disposition regions) on the first substrate 1 that correspond to the blue display regions C.

Figure 14G:
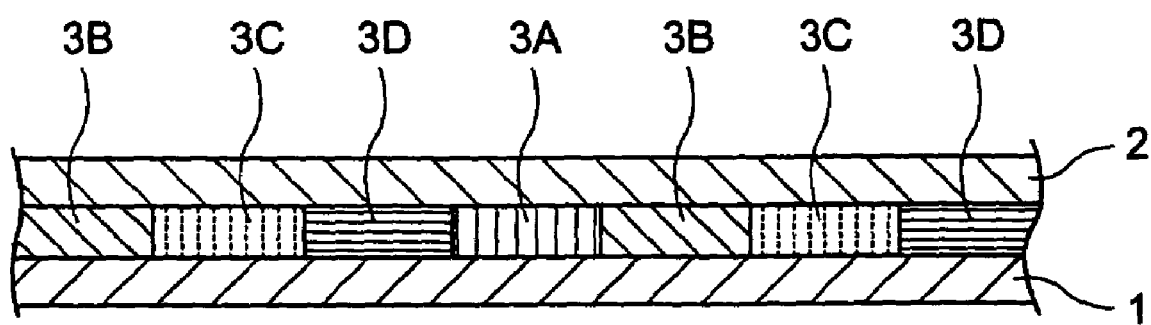
FIG. 14G is a schematic illustrating the method of manufacturing an electrophoretic display according to an exemplary embodiment of the present invention.

Then, as shown in FIG. 14G, the second substrate 2 is pressure-bonded to the first substrate 1 for example, whereby the first substrate 1 is bonded to the second substrate 2. If non-disposition regions are slightly larger than disposition regions in area as described above, the display parts 3 are pressed on the substrate so as to be spread, thereby filling gaps between the display parts 3.

Thereafter, the first substrate 1 and the second substrate 2 are sealed with a sealing member, while the scanning lines 71a, the data lines 70a and the common electrode 8 are connected to an external driver and so forth. Thereby, the electrophoretic display 10, shown in FIGS. 1 and 2, is manufactured.

As described above, in the method of manufacturing the electrophoretic display 10 according to this third exemplary embodiment, the display parts are separately disposed on two substrates 1 and 2. Therefore, the number of display parts disposed on each substrate 1 and 2 can be reduced to about half compared to conventional technique. Thus, the manufacturing of an electrophoretic display is facilitated.

In addition, in the method of manufacturing the electrophoretic display 10 according to this third exemplary embodiment, the first substrate 1 and the second substrate 2 are bonded to each other after the slurry X is dried at a predetermined temperature for a predetermined period. Thus, the display parts 3 capable of displaying different colors can be prevented from mixing with each other. Therefore, in an electrophoretic display, color mixture between regions displaying different colors can be prevented.

In the method of manufacturing the electrophoretic display 10 according to this third exemplary embodiment, the green display part 3B and the black display part 3D that are disposed on the first substrate 1 are constituted as the first display part, while the red display part 3A and the blue display part 3C that are disposed on the second substrate 2 are constituted as the second display part.

Although, as described above, the exemplary embodiments of a method of manufacturing an electrophoretic display according to the present invention have been explained referring to the attached drawings, it will be obvious that the present invention is not limited to the above described exemplary embodiments. The shapes, the combinations or the like of the components described in the above exemplary embodiments are an example, and various modifications can be made based on a design demand or the like without departing from the scope of the present invention.

For example, in the above described second exemplary embodiment, the throughput in manufacturing the electrophoretic display 10 is improved by disposing the common electrode 8 on the base substrate 20. However, the present invention is not limited thereto. For example, the pixel electrodes 7a and the TFT elements 7b may be formed on the base substrate 20 and then the base substrate 20 on which the pixel electrodes 7a and the TFT elements 7b have been formed may be cut together with the display parts 3. Subsequently, the cut base substrate 20 may be disposed on the second substrate 2. In this case, the base substrate 20 is used as the first substrate 1. As described above in the second exemplary embodiment, by previously forming the pixel electrodes 7a and the TFT elements 7b on the base substrate 20, the throughput in manufacturing the electrophoretic display 10 can be improved.

In the first and second exemplary embodiments, the surface of the first substrate 1 on which the display parts 3 are to be disposed is illustrated as a substantially flat surface. However, the present invention is not limited thereto but can be applied to the case in which the surface of the first substrate 1 is a curved surface, for example.

In the above described third exemplary embodiment, the second substrate 2 is pressed to the first substrate 1, whereby the first substrate 1 is bonded to the second substrate 2. However, the present invention is not limited thereto. For example, by inserting the first substrate 1 and the second substrate 2 between a pair of rollers, the first substrate 1 and the second substrate 2 may be bonded to each other by pressure-bonding.

In the third exemplary embodiment, disposition regions and non-disposition regions are formed on the substrates 1 and 2 by using the masking materials 11. However, the present invention is not limited thereto. For example, disposition regions and non-disposition regions may be formed by using a mask member that is a mold in which openings corresponding to the disposition regions are formed. The use of such a mask member permits the improvement of the throughput in manufacturing a plurality of electrophoretic displays 10.

In the above described exemplary embodiments, the microcapsules 31 into which the dispersion liquid 32, the white particles 33 and the colored particles 34 are filled are used as the display parts 3. However, the present invention is not limited thereto. Microcapsules into which a colored dispersion liquid and the white particles 33 are filled may be used as the display parts. In such a display part, when a voltage is applied so that the pixel electrode 7a becomes positive, the white particles 33 are attracted toward the pixel electrode 7a, with the result that the color of the dispersion liquid is displayed in the display regions. In addition to this, the method of manufacturing an electrophoretic display according to the exemplary embodiments of the present invention can also be applied to a manufacturing method of an electrophoretic display that is full-colored by making up the display parts only of the black display parts 3D capable of displaying white or black color, and disposing a color filter over these display parts.

Also, gyricon beads may be used as the display parts 3. The gyricon beads are microcapsules that include particles having one hemisphere surface negatively charged and colored in white and the other hemisphere surface positively charged and colored in a color other than white. In the gyricon beads, the orientation of the particles are changed in response to the application of an electric field, thereby displaying colors in display regions.

Furthermore, the microcapsules 31 are spherical in the above described exemplary embodiments. However, they need not necessarily be spherical but may be substantially square-shaped, for example.

Also, in the above described exemplary embodiments, a full-color electrophoretic display is obtained by incorporating the display parts of four kinds 3A through 3D into the electrophoretic display 10. However, the present invention is not limited thereto but can also be applied to the manufacturing of an area-color electrophoretic display having the display parts of two kinds, for example.

Also, the display parts 3A through 3D are arranged in a strip in the above described exemplary embodiments. However, the present invention is not limited thereto. For example, the display parts may be arranged in a delta shape or in a mosaic.

The adoption of the black display parts 3D allows the fabrication of a full-color electrophoretic display having improved contrast in the above described exemplary embodiments. However, the present invention is not limited thereto but can also be applied to the manufacturing of an electrophoretic display employing only three colors of RGB, for example.

What is claimed is:

1. A method of manufacturing an electrophoretic display, the method comprising:
   forming a first display part over a first substrate, the first display part including a plurality of first microcapsules, each of the plurality of first microcapsules including at least a first particle and a dispersion liquid;
   forming a second display part over a second substrate, the second display part including a plurality of second microcapsules, each of the plurality of second microcapsules including at least a second particle and a dispersion liquid; and
   disposing the second display part over a first portion of the first substrate at which the first display part is not formed.

2. The method of manufacturing an electrophoretic display according to claim 1, further comprising:
   before the process of disposing the second display part over a first portion the first substrate, removing the second display part from the second substrate.

3. The method of manufacturing an electrophoretic display according to claim 2, further comprising:
   after the process of disposing the plurality of second display parts on a plurality of portions of the first substrate, removing the second display part from the second substrate by cutting off with a part of the second substrate.

4. The method of manufacturing an electrophoretic display according to claim 3, the second substrate having an electrode.

5. The method of manufacturing an electrophoretic display according to claim 1, further comprising;
   after the process of forming of the second display part over the second substrate, laminating the first and the second substrate to dispose the second display part to the first portion.

6. The method of manufacturing an electrophoretic display according to claim 1, the first display part including the plurality of first microcapsules and a binder, the binder binding the plurality of the microcapsules to each other.

7. The method of manufacturing an electrophoretic display according to claim 1, the process of forming the first display part including:
   disposing a mask material over the first substrate to define the first portion that is surrounded by the mask material;
   applying a liquid material to the first portion, the liquid material including plurality of first microcapsules;
   evaporating the liquid material to form the first display part that is surrounded by the mask material, the first display part including the plurality of first microcapsules; and
   removing the mask material.

8. A method of manufacturing an electrophoretic display, the method comprising:
   forming a mask material over a base substrate to define a portion that is surrounded by the mask material;
   applying a liquid material to the portion, the liquid material including the plurality of microcapsules, each of the plurality of microcapsules including at least a particle and a dispersion liquid;

evaporating the liquid material to form the display part that is surrounded by the mask material, the display part including the plurality of microcapsules;

laminating the base substrate to an another substrate to dispose the display portion over the another substrate.

9. A method of manufacturing an electrophoretic display, the method comprising:

forming a first display part over a first base substrate, the first display part including a plurality of first microcapsules, each of the plurality of first microcapsules including at least a first particle and a dispersion liquid;

forming a second display part over a second base substrate, the second display part including a plurality of second microcapsules, each of the plurality of second microcapsules including at least a second particle and a dispersion liquid;

disposing the first display part over a first portion of a first substrate; and disposing the second display part over a second portion of the first substrate, the first display part and the second display part not overlapping with each other.

10. The method of manufacturing an electrophoretic display according to claim 9, the first base substrate including a first partition wall that defines a portion at which the first display part is formed.

11. The method of manufacturing an electrophoretic display according to claim 9, further comprising:

laminating a second substrate to the first substrate to bind the first and the second display parts between the first and the second substrates after the process of disposing the second display part.

12. The method of manufacturing an electrophoretic display according to claim 9, the first display part being disposed to the first portion via adhesive material.

13. The method of manufacturing an electrophoretic display according to claim 9, the first substrate being a film.

* * * * *